United States Patent [19]

Herrmann et al.

[11] Patent Number: 5,491,803
[45] Date of Patent: Feb. 13, 1996

[54] RESPONSE RESOLVER FOR ASSOCIATIVE MEMORIES AND PARALLEL PROCESSORS

[75] Inventors: Frederick P. Herrmann, Cambridge; Charles G. Sodini, Belmont, both of Mass.

[73] Assignee: Massachusetts Institute of Technology, Cambridge, Mass.

[21] Appl. No.: 431,478

[22] Filed: May 1, 1995

Related U.S. Application Data

[63] Continuation of Ser. No. 887,327, May 22, 1992, abandoned.

[51] Int. Cl.$^6$ ............... G06F 7/00; G06F 9/00; G06F 9/46; H03K 19/094
[52] U.S. Cl. ............ 395/287; 395/732; 364/715.01; 326/119
[58] Field of Search ........................ 395/325, 725, 395/425; 364/715.01; 326/119

[56] References Cited

U.S. PATENT DOCUMENTS

| | | | |
|---|---|---|---|
| 3,618,027 | 11/1971 | Feng | 395/600 |
| 4,153,943 | 5/1979 | Anderson | 365/49 X |
| 4,499,538 | 2/1985 | Finger et al. | 395/725 |
| 4,541,067 | 9/1985 | Whitaker | 364/716 |
| 4,622,648 | 11/1986 | Whitaker | 364/715 |
| 4,975,873 | 12/1990 | Nakabayashi et al. | 365/49 |
| 5,325,501 | 6/1994 | Carlstedt | 395/425 |

OTHER PUBLICATIONS

Wade et al. "Aternary Content Addressable Search Engine" IEEE Journal of Solid–State Circuits vol. 24, No. 4, Aug. 1989 pp. 1003–1013.

Herrmann et al. "A Dynamic Associative Processor for Machine Vision applications" IEEE Micro, vol. 12, No. 3, Jun. 1992, pp. 31–41.

Anderson, G. A., "Multiple Match Resolvers: A New Design Method," *IEEE Transactions on Computers*, C–23, 1317–1320 (1974).

Foster, C. C., *Content Addressable Parallel Processors*, New York: Van Nostrand Reinhold Company, 146–167 (1976).

Foster, C. C., and Stockton, F. D., "Counting Responders in an Associative Memory," *IEEE Transactions on Computers*, C–20, 1580–1583 (1971).

Foster, C. C., "Determination of Priority in Associative Memories," *IEEE Transactions on Computers*, C–17, 788–789 (1968).

Frei, E. H., and Goldberg, J., "A Method for Resolving Multiple Responses in a Parallel Search File," *IRE Transactions on Electronic Computers*, EC–10, 718–722 (1961).

Kadota, H., et. al., "An 8–kbit Content–addressable and Reentrant Memory," *IEEE Journal of Solid State*

(List continued on next page.)

*Primary Examiner*—Michael A. Whitfield
*Attorney, Agent, or Firm*—Choate, Hall & Stewart

[57] ABSTRACT

A logic circuit for a content-addressable-memory or parallel-processor array cell implements both prioritizing and counting functions for response resolution. It includes a means for receiving from a prior cell a response-resolution token and a means for receiving the positive or negative response of the current cell to a pattern to be matched. It also includes a means for deriving as a function of the prior cell's response-resolution token a response-resolution token for the current cell that implements prioritization and counting response-resolution functions for positive or negative pattern-matching responses of the current cell. Finally, it includes a means for selecting for the current cell the appropriate response-resolution token based on the cell's positive or negative pattern-matching response and a means for sending that response-resolution token to a subsequent cell. In a preferred embodiment of the invention, the means for selecting the current cell's response-resolution token for a positive or negative pattern-matching response uses a simple pass-transistor switching circuit.

19 Claims, 4 Drawing Sheets

Circuits, SC–20(5), 951–957 (1985).

Landis, D., "Multiple–response Resolution in Associative Memories," *IEEE Transactions on Computers,* C–26, 230–235 (1977).

Lipovski, G. J., "A Four Megabit Dynamic Systolic Associative Memory Chip," *Journal of VLSI Signal Processing,* 4(1), 37–51 (1992).

Lipovski, G. J., and Vaughn, P., "A Fetch–and–op Implementation for Parallel Computers," *Proceedings 15th Annual Symposium on Computer Architecture,* 2–10 (1988).

Miiler, H. S., "Resolving Multiple Responses in an Associative Memory," *IEEE Transactions on Electronic Computers,* ED–13, 614–616 (1964).

Saxton, T. L., and Huang, C. C., "An Optimal Frame Synchronization Technique Using an Associative Processor," *IEEE Transactions on Computers,* C–26, 170–174 (1977).

Shibuya, T., et al., "Application Specific Massively Parallel Machine," *Proceedings of the Third Symposium on the Frontiers of Massively Parallel Computation,* 274–277 (1990).

Weinstein, H., "Proposals for Ordered Sequential Detection of Simultaneous Multiple Responses," *IEEE Transactions on Electronic Computers,* EC–12, 564–567 (1963).

Yeap, T. H., et al., "Implementing the VASTOR Architecture using a VLSI Array of 1–bit Processors," *IEEE International Conference on Computer Design,* 494–499 (1985).

RESPONSE RESOLVER FOR ASSOCIATIVE MEMORIES AND PARALLEL PROCESSORS

This is a continuation of application Ser. No. 07/887,327 filed on May 22, 1992, now abandoned.

BACKGROUND OF THE INVENTION

1. Technical Field

The invention relates in general to digital circuit design and specifically to the design of response resolvers for associative memories and parallel processors.

2. Prior Art

Associative or content-addressable memory [is there a distinction?] is memory that is accessed not by the addresses of its memory elements but by the data stored in those elements. When a conventional memory is read, the address lines are used to indicate the memory element whose contents are of interest, and the data stored in that element appear at the memory's data lines. With content-addressable memory, the data itself are used to determine which memory elements respond. The data of interest are applied to the memory, and each memory element whose contents match the data input responds to indicate the match. Moreover, the input data can indicate a set of values (e.g., all numbers between 16 and 23), rather than just a single value, to be matched. It can be seen, then, that with content-addressable memory, more than one memory element can respond to a single request. Unlike conventional memory, in which each element's address is unique, multiple content-addressable memory elements can contain, and therefore respond to, a given data request. This creates the need for a means to determine which memory elements are responding.

Similar considerations arise in the operation of associative parallel processors. Although each element in such systems is not just a memory but also a processor for the manipulation of data, when the processor is addressed by a particular data pattern, multiple processing elements can respond in the same way as multiple content-addressable memory elements. Therefore, parallel processors also require a means of determining which of their elements are responding.

For both content-addressable memories and associative parallel processors, the process of determining which elements are responding is termed response resolution. A response resolver can provide various kinds of information both about whether there are any responders and about their locations in the memory or processor array. For example, in some situations, it is desirable to know the locations of all the responders; in others, it may be necessary to determine the number of responding elements. For either problem, there are solutions in the prior art. To determine responder locations, an iterative approach is typically used. The first step is for the resolver to determine if there are any responders. To do so, it uses a prioritization scheme by which the highest-priority responder can be found and its location determined. Then the resolver temporarily disables that highest-priority responder and repeats the process, determining the location of the next-highest-priority responder. This process is repeated with the remaining responders until none remains. This iterative response resolution can be implemented with the prior art OR-gate chain shown in FIG. 1. Each input on the left side of the chain corresponds to one processing element (PE) and is asserted if that PE is a responder. It can be seen that the output on the right side is asserted only if the PE is a responder and there are no higher-priority responders. In the figure, PE1 is the first responder; it passes a 1 down the chain to inhibit PE2 and lower-priority responders. The bottom of the chain produces a some/none response to indicate whether any PEs are responding. The system can then recognize the PE with an output of 1 as a responder, disable its response, and continue the process until no responders remain, as indicated by a 0 at the bottom of the chain.

Another response-resolution approach is to count the number of responders. The prior art chain of exclusive-or (XOR) gates in FIG. 2 can be used to count responders in $\log_2 N$ steps, where N is the length of the chain. The basic procedure is to successively derive the bits of a binary count of the responders by, in each step, determining the exclusive-or of the responders and then disabling one-half of them. The figure shows the three steps of the procedure for a chain of length seven. Initially, in Step 1, there are six responders, and the last gate in the chain produces a 0 as the least significant bit of the count. In the next step, every other responder is disabled, so that three remain and a 1 is the output of the chain. Finally, every other responder is again disabled, and a most significant bit of 1 is produced. The three bits, in reverse order, give $110_2 = 6$, the number of responders.

Each of these approaches, prioritization and counting, has its uses in various applications. Therefore, it is desirable, especially for integrated-circuit implementations of association memories and processors, to provide the capability to implement either technique. Moreover, it is important that any such implementation be sufficiently simple so as not to occupy a great deal of space on the chip. The invention disclosed here meets these requirements, as described below.

SUMMARY OF THE INVENTION

The present invention is a logic circuit for a content-addressable-memory or parallel-processor array cell that implements both prioritizing and counting functions for response resolution. It includes a means for receiving from a prior cell a response-resolution token and a means for receiving the positive or negative response of the current cell to a pattern to be matched. It also includes a means for deriving as a function of the prior cell's response-resolution token a response-resolution token for the current cell that implements prioritization and counting response-resolution functions for positive or negative pattern-matching responses of the current cell. Finally, it includes a means for selecting for the current cell the appropriate response-resolution token based on the cell's positive or negative pattern-matching response and a means for sending that response-resolution token to a subsequent cell.

In a preferred embodiment of the invention, the response-resolution tokens are comprised of at least two bits.

In another preferred embodiment of the invention, the response-resolution token for the current cell in the case of a negative pattern-matching response of the current cell is the same as the response-resolution token for the prior cell. Again in a preferred embodiment, the response-resolution token for the current cell in the case of a positive pattern-matching response of the current cell is a two-bit token, where the two bits are one of the response-resolution token bits from the prior cell and that bit's complement.

In a preferred embodiment of the invention, the means for selecting the current cell's response-resolution token for a positive or negative pattern-matching response uses a switching circuit. More specifically, the switching circuit can be a network of pass transistors.

Finally, in a preferred embodiment of the invention, it includes a means for actively driving the bits of the current cell's response-resolution token to their derived logic levels, rather than relying solely on the pass-transistor switching mechanism.

DESCRIPTION OF THE PREFERRED EMBODIMENT

The invention disclosed herein provides response resolution for content-addressable memory or associative parallel processors. The elements of such memory or processor arrays respond to a pattern presented to the arrays, and the response resolution process provides a means of indicating which processing elements (PEs) match a given pattern. This process can be performed with either a prioritizing or a counting approach. With either approach, the memory or processor is organized into a series of cells, each of which communicates a response to the next cell in the series. Each cell provides a response output that is dependent on its own response and on that received from the previous cell. The two approaches differ, however, in how they generate their response outputs and in how they are used.

Figure 1:
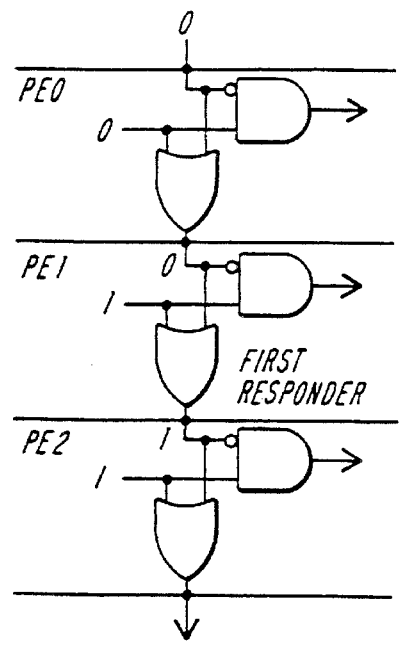
FIG. 1 is a schematic drawing of a prior art OR-gate prioritization chain.
Figure 2:
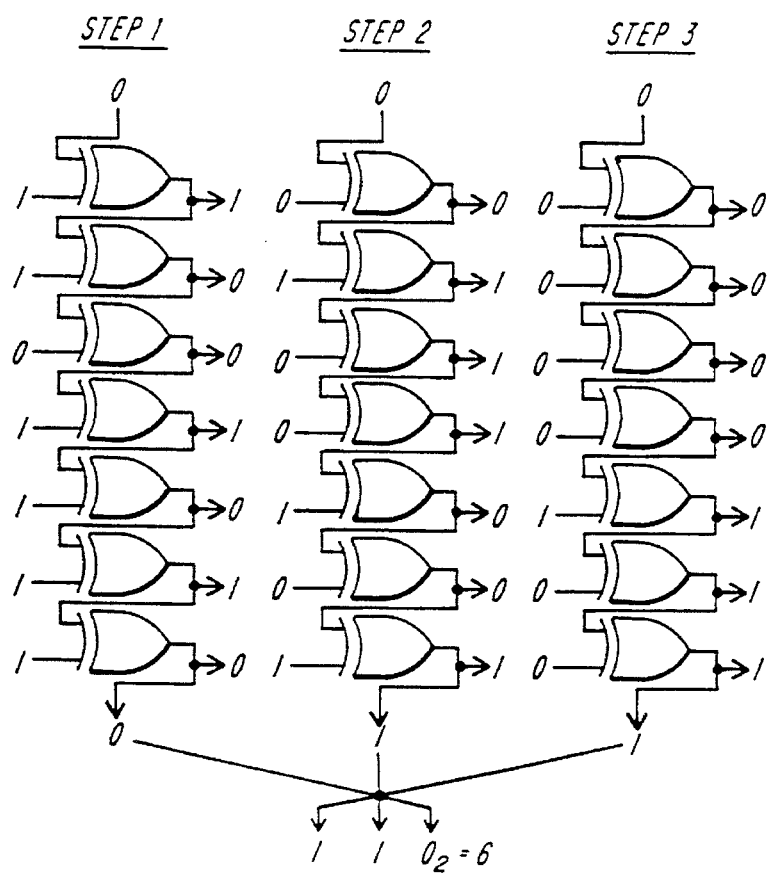
FIG. 2 is a schematic drawing showing several steps in the operation of a prior art exclusive-or-gate counting chain.

With the prioritization technique, each cell sends a positive output either if it is a responder to the pattern presented or if the previous cell sent a positive output to it; this approach thus implements an OR response, as shown in FIG. 1. In the counting approach, in contrast, each responding cell changes the output signal from that received from the previous cell; it thus implements the exclusive-or (XOR) response shown in FIG. 2. (With both approaches, non-responding cells pass their inputs through unchanged to their outputs.) The two approaches also differ in the further processing required to obtain the desired response information. With prioritization, in successive iterations the first responder is disabled, allowing the next-highest-priority responder to signal its response; the process is then repeated for that responder, and so on until all of the responders have been determined. If at each iteration the location of the first responder is stored, at the completion of the process the locations of all the responders will be known. The counting technique operates differently. With counting, successive steps disable every other responding PE, as shown in FIG. 2, so that the number of responding PEs is reduced by half at each step; therefore, the XOR outputs from each step form, from least-significant to most-significant bit, a binary number representing the number of responders.

The present invention implements both the prioritizing and the counting functions. It can be noted from the preceding description and from FIGS. 1 and 2 that each of the approaches requires that one bit of information be transmitted from cell to cell in a series. Therefore, to allow both priority and counting information to be transmitted, the invention uses a two-bit token. There are many possible embodiments by which the invention of combining these two response resolution techniques can be implemented. It is essential only that (1) each responder must toggle the two bits between different states to implement the counting function and (2) the first responder must change the bits from their initial state to indicate that a response has been received for the prioritization function. Any implementation that meets both these requirements is an embodiment of the invention.

To implement the counting function, for example, the two-bit tokens 01 and 10 can be used. The toggling function is implemented if a responding cell switches from one of these tokens to another. For example, if $T_{in}$ is the token received by a cell and $T_{out}$ is the token sent by a cell, the counting function can be implemented as shown in the following table:

TABLE I

Typical Two-Bit Toggling Function

|  | $T_{out}$ | Response of Current Cell | |
|---|---|---|---|
|  |  | 0 | 1 |
| $T_{in}$ | 01 | 01 | 10 |
|  | 10 | 10 | 01 |

As the table shows, each responding PE reverses the 01 and 10 tokens, providing an XOR function. Then if a 10 token is interpreted as a 0 and a token is interpreted as a 1, when the first in a series of cells is presented with a 10 token, representing a 0, the output of the last cell in the series will be the exclusive-or of the responding cells. This function can then be used as described above to count the number of responders.

The prioritization function can be implemented using a similar approach. Consider the following table:

TABLE II

Typical Two-Bit Prioritization Function

|  | $T_{out}$ | Response of Current Cell | |
|---|---|---|---|
|  |  | 0 | 1 |
| $T_{in}$ | 00 | 00 | 01 or 10 |
|  | 01 or 10 | 01 or 10 | 01 or 10 |

Under this scheme, the first responding cell changes the 00 token to 01 or 10, and further responders toggle between 10 and 01. (Actually, toggling is not necessary for prioritization; it is only necessary that later responders to not change the token back to 00.) The first cell whose output is not 00 is then the highest-priority cell. Therefore, this approach can be used as described with iterative disablement of the highest-order responder to determine all of the responding elements.

Figure 3:
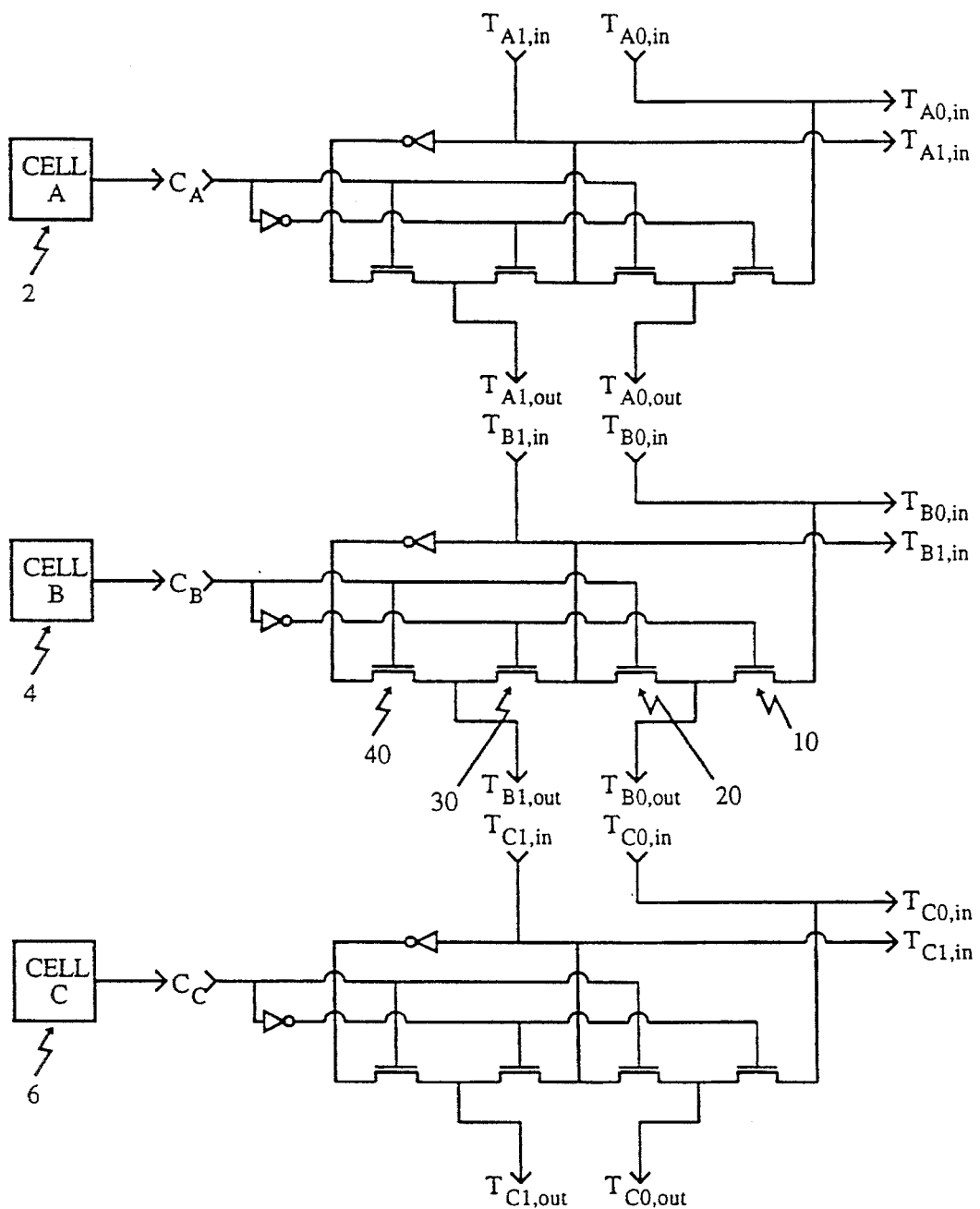
FIG. 3 is a schematic drawing of an embodiment of the invention showing the implementation of both prioritization and counting functions using pass-transistor switching between the two possible response-resolution outputs.

Both of the functions described in the previous paragraphs are implemented by the embodiment of the invention shown in FIG. 3. FIG. 3 shows a portion of the circuit which corresponds to three cells—a prior cell A 2, the cell of interest B 4 and a next cell C 6. The circuit components are identified by the subscripts A, B and C, respectively. The invention may be understood by referring to the portion of the circuit which corresponds to cell B 4. The circuit receives its input from the output of the prior cell. That is, $T_{B,in}=T_{A,out}$. The pass transistors 10, 20, 30, and 40 provide for switching between two values for $T_{B,out}$: if transistors 10 and 30 are on, $T_{B,out}=T_{B,in}$; if transistors 20 and 40 are on, $T_{B1,out}=T_{B1,in}$ and $T_{B0,out}=T_{B1,in}$. The pass transistors are themselves controlled by response bit $C_B$, which is output by the cell 4 and is 0 if the cell is not responding and 1 if it is responding. When the response bit is 0 it turns on transistors 10 and 30, and when it is 1, it turns on transistors 20 and 40. The output $T_{B,out}$ is then used as the input $T_{C,in}$ for the next cell. These functions result in the following operations for the circuit:

TABLE III

Logic Function of FIG. 3

|  | $T_{out}$ | Response of Current Cell | |
|---|---|---|---|
|  |  | 0 | 1 |
| $T_{in}$ | 00 | 00 | 10 |
|  | 01 | 01 | 10 |
|  | 10 | 10 | 01 |

It can be seen in Table III that the embodiment in FIG. 3 implements both the prioritization and counting functions by combining the functions of Tables I and II. If the input token to the first in a chain of cells is 00, the first responding cell will produce an output token of 10, and the outputs of subsequent cells will be either 01 or 10, so the circuit implements the prioritization function. In addition, the circuit implements the function of Table II above if a 10 token is interpreted as a 0 and a 01 token interpreted as a 1. Then, since responding cells toggle 10 to 01 and 01 to 10, if the first cell in the series has an input token of 10, the output of the series will provide the exclusive-or function required for counting. (Alternatively, if a 10 token is interpreted as a 1 and both 00 and 01 tokens are interpreted as 0s for the counting function, an input token of 00 can be provided to the first cell in the series, and the circuit can implement both the counting and prioritizing functions simultaneously.)

Several points about the embodiment of the invention shown in FIG. 3 are important. First is that the particular selection of tokens used is not important. It is only important that, as described above, the first responder change the token state from its initial state for the prioritization function and that each responder toggle the token for the counting function. The key point is the combination of the prioritization and counting functions, and other logic functions can also provide that combination.

Second, the invention's switching function in FIG. 3 is implemented by pass transistors. Pass transistors provide a switching means with several advantages, as noted in U.S. Pat. Nos. 4,541,067 and 4,622,648. These advantages are not essential for the invention, however, and it could be implemented by means other than pass transistors. It is important only that the chosen means perform the switching functions required by the invention. For example, CMOS transistors or even a mechanical relay system could perform the same functions. The pass transistors have the advantage, however, of taking up little space in an integrated-circuit implementation. Unfortunately, pass transistors also have the disadvantage that instead of actively driving their output signals to the desired value, they pass through their input signals to their output signals. The signals, therefore, can degrade from one cell to the next. (This characteristic of pass transistors is noted, for example in U.S. Pat. Nos. 4,541,067 and 4,622,648.) In some applications, it may be necessary to provide drivers for the response resolution signals so as to avoid potential signal degradation problems.

Figure 4:
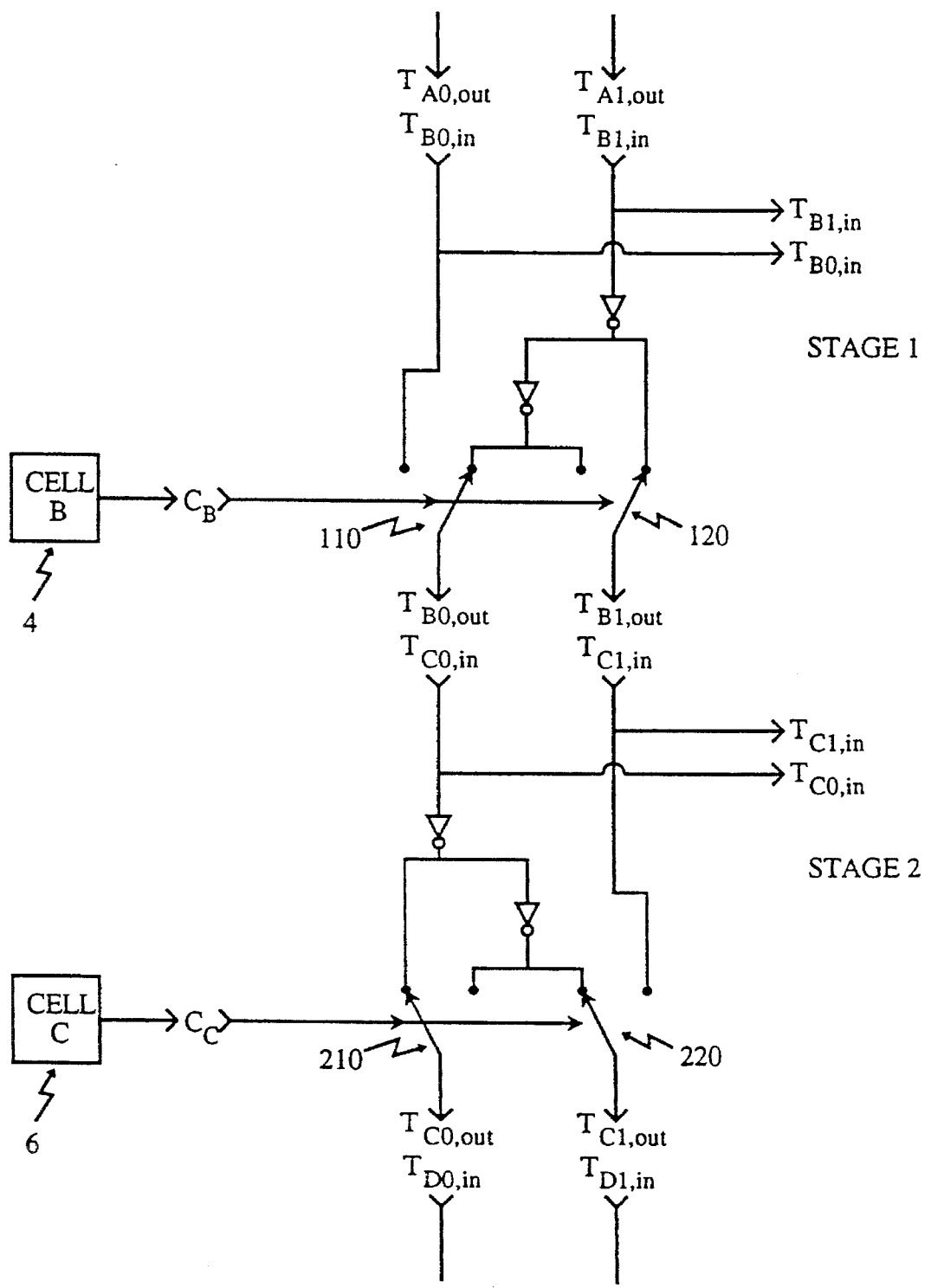
FIG. 4 is a schematic drawing of two stages of an embodiment of the invention using inverters to actively drive the invention's response-resolution outputs.
Figure 5:
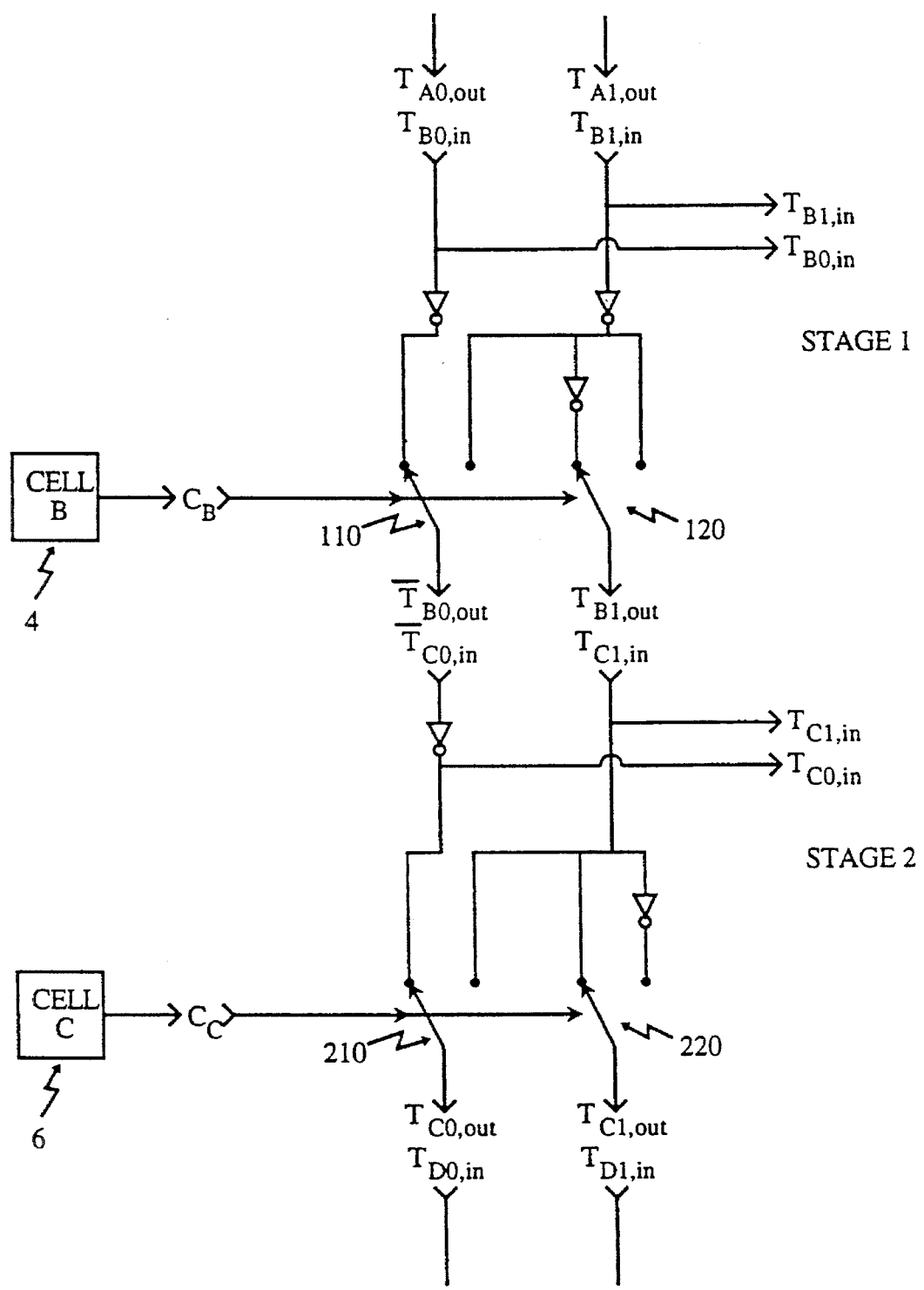
FIG. 5 is a schematic drawing of two stages of an alternative embodiment of the invention, also using inverters to drive the invention's response-resolution outputs.

FIGS. 4 and 5 show circuits that implement the logic functions required for the prioritization and counting functions with drivers to avoid signal degradation. As well as demonstrating the use of drivers in embodiments of the invention, these figures also show the flexibility inherent in implementing the invention. Consider FIG. 4. The figure shows two complete stages of the invention denoted by the subscripts B and C, an output from a prior stage denoted by the subscript A, and the input to a next stage denoted by the subscript D. Each stage performs the prioritization and counting functions for one cell in a series. The switch pairs 110–120 and 210–220 perform the same functions as the pass transistors 10, 20, 30 and 40 in FIG. 3, and like them could be implemented by any switching method. Also as in FIG. 3, the switch pairs are controlled by responses from their corresponding cells. Switch pair 110–120 is controlled by response $C_B$ from cell B 4; while switch pair 210–220 is controlled by response $C_C$ from cell C 6. In FIG. 4, the switches for both stages are shown in the position they take when the corresponding cell is responding. The first stage, which receives its input from the output of the prior stage, then, performs the following function:

TABLE IV

Logic Function of FIG. 4, Stage 1

|  | $T_{out}$ | Response of Current Cell | |
|---|---|---|---|
|  |  | 0 | 1 |
| $T_{in}$ | 00 | 00 | 10 |
|  | 01 | 01 | 10 |
|  | 10 | 10 | 01 |

This is the same result as is shown in Table III for the circuit of FIG. 3. The second stage of FIG. 4 performs slightly differently, as is shown by the following table:

TABLE V

Logic Function of FIG. 4, Stage 2

|  | $T_{out}$ | Response of Current Cell | |
|---|---|---|---|
|  |  | 0 | 1 |
| $T_{in}$ | 00 | 00 | 01 |
|  | 01 | 01 | 10 |
|  | 10 | 10 | 01 |

Thus, the function when the cell is not responding is identical to that of Tables III and IV, but when the cell is responding this circuit sends to its output two bits comprising $T_0$ and its inversion rather than $T_1$ and its inversion as with the other circuits. This approach still implements the functions of the invention, however, because a responding cell will change a 00 token to a non-zero 01 token, implementing prioritization, and will toggle a 01 or 10 token, providing the exclusive-or counting function. Moreover, with this circuit, a signal can pass no more than one stage without being actively driven to its desired voltage, so the circuit eliminates the signal degradation problem.

FIG. 5 shows two complete stages of a different circuit configuration, as well as the output from a prior stage and the input to a next stage. The subscripts have the same meaning as in FIG. 4. The operation of these stages is shown in the following tables:

TABLE VI

Logic Function of FIG. 5, Stage 1

|  | $T_{out}$ | Response of Current Cell |  |
|---|---|---|---|
|  |  | 0 | 1 |
| $T_{in}$ | 00 | 00 | 10 |
|  | 01 | 01 | 10 |
|  | 10 | 10 | 01 |

TABLE VII

Logic Function of FIG. 5, Stage 2

|  | $T_{out}$ | Response of Current Cell |  |
|---|---|---|---|
|  |  | 0 | 1 |
| $T_{in}$ | 00 | 00 | 10 |
|  | 01 | 01 | 10 |
|  | 10 | 10 | 01 |

(Note that the low-order-bit output of the first stage and input to the second stage is $\overline{T_0}$, not $T_0$.) Each stage in FIG. 5 thus operates exactly as the circuit in FIG. 3. However, FIG. 5, like FIG. 4, provides drivers for the circuits, so it also avoids signal degradation problems. FIG. 5 also has an advantage over FIG. 4 in that it has only a maximum three-gate delay through the two stages, while FIG. 4 has a four-gate delay. FIG. 5 is less desirable than FIG. 4, however, in that its two stages require 18 transistors to FIG. 4's 16, and its circuit configurations are different for the two stages, which could make integrated-circuit layout more difficult.

In sum, FIGS. 3, 4, and 5 show several of the possible embodiments of the invention. The common feature that they share, and that is essential to the invention, is the combination of the response resolution techniques of prioritization and counting. The invention combines those features in a circuit that provides different response resolution outputs from an associative memory or parallel processor cell based on whether that cell is responding to the pattern presented to the memory or processor array. Within that method of operation, the possible embodiments of the invention are limited only by the claims.

What is claimed is:

1. A logic circuit for both prioritizing and counting responses from a plurality of cells of an array comprising:
    a means for generating a first token in an initial state;
    a plurality of stages wherein each stage is associated with one cell of the plurality of cells and each stage comprises
        a) a first input for receiving an input token, wherein possible states of the input token include an initial state, a first toggle state, and a second toggle state,
        b) a second input for receiving a response from the said cell associated with said stage,
        c) a first output for sending an output token, wherein possible states of the output token include the initial state, the first toggle state, and the second toggle state,
        d) a second output for sending the input token, and
        e) logic means for determining the state of the output token wherein the state of the output token is the same as the state of the input token if the response from the associated cell is negative, the state of the output token may be either the first toggle state or the second toggle state if the response from the associated cell is positive and the input token is in the initial state, the state of the output token is the first toggle state if the response from the associated cell is positive and the input token is in the second toggle state, and the state of the output token is the second toggle state if the response from the associated cell is positive and the input token is in the first toggle state;
    means for connecting the means for generating the first token to the first input of a first stage; and
    means for connecting the first output of each stage except for a last stage to the first input of a next stage, whereby a chain of stages is formed and
    whereby the responses from the plurality of cells may be prioritized and counted based on the second output of each stage and the first output of the last stage.

2. The logic circuit of claim 1 wherein the array is a content-addressable memory.

3. The logic circuit of claim 1 wherein the array is a parallel-processor array.

4. The logic circuit of claim 1 wherein said first output of said stages further comprises pass transistors.

5. The logic circuit of claim 1 wherein each stage further comprises buffers.

6. The logic circuit of claim 1 wherein each stage further comprises drivers.

7. The logic circuit of claim 1 wherein said first output of said stages further comprises inverters.

8. The logic circuit of claim 1 wherein the plurality of stages comprises stages of the same type.

9. The logic circuit of claim 1 wherein the plurality of stages comprises a plurality of different types of stages.

10. The logic circuit of claim 9 wherein the plurality of stages comprises stages of two different types.

11. The logic circuit of claim 1 wherein the logic means for at least one of said plurality of stages comprises digital logic.

12. The logic circuit of claim 11 wherein a maximum delay through any two consecutive stages is a three-gate delay.

13. The logic circuit of claim 1 wherein the input token, the output token, the first input, the first output and the second output each comprise two bits, designated as bit 1 and bit 0.

14. The logic circuit of claim 13 wherein the initial state is 00, the first toggle state is 01, and the second toggle state is 10, where the first digit in the token is bit 1 and the second digit is bit 0.

15. The logic circuit of claim 14 wherein all the stages are identical and the logic means of each stage further comprises:
    an inverter which negates bit 1 of the first input;
    a first switch which passes the negated bit 1 of the first input to bit 1 of the first output when the response of the associated cell is positive and which passes bit 1 of the first input to bit 1 of the first output when the response of the associated cell is negative; and
    a second switch which passes bit 1 of the first input to bit 0 of the first output when the response of the associated cell is positive and which passes bit 0 of the first input to bit 0 of the first output when the response of the associated cell is negative.

16. The logic circuit of claim 14 wherein the plurality of stages comprises stages of a first type and stages of a second type, the first output of every stage is not connected to the first input of a stage of the same type, the logic means of stages of the first type comprise:

a) a first inverter which negates bit 1 of the first input;

b) a second inverter which negates the output of the first inverter;

c) a first switch which passes the output of the first inverter to bit 1 of the first output when the response of the associated cell is positive and which passes the output of the second inverter to bit 1 of the first output when the response of the associated cell is negative; and d) a second switch which passes the output of the second inverter to bit 0 of the first output when the response of the associated cell is positive and which passes bit 0 of the first input to bit 0 of the first output when the response of the associated cell is negative, and the logic means of stages of the second type comprise:

a) a first inverter which negates bit 0 of the first input;

b) a second inverter which negates the output of the first inverter;

c) a first switch which passes the output of the second inverter to bit 1 of the first output when the response of the associated cell is positive and which passes bit 1 of the first input to bit 1 of the first output when the response of the associated cell is negative; and d) a second switch which passes the output of the first inverter to bit 0 of the first output when the response of the associated cell is positive and which passes the output of the second inverter to bit 0 of the first output when the response of the associated cell is negative.

17. The logic circuit of claim 14 wherein the plurality of stages comprises stages of a first type and stages of a second type, the first output of every stage is not connected to the first input of a stage of the same type, the logic means of stages of the first type comprise:

a) a first inverter which negates bit 1 of the first input;

b) a second inverter which negates the output of the first inverter;

c) a third inverter which negates bit 0 of the first input;

d) a first switch which passes the output of the first inverter to bit 1 of the first output when the response of the associated cell is positive and which passes the output of the second inverter to bit 1 of the first output when the response of the associated cell is negative; and e) a second switch which passes the output of the first inverter to bit 0 of the first output when the response of the associated cell is positive and which passes the output of the third inverter to bit 0 of the first output when the response of the associated cell is negative, and the logic means of stages of the second type comprise:

a) a first inverter which negates bit 1 of the first input;

b) a second inverter which negates bit 0 of the first input;

c) a first switch which passes the output of the first inverter to bit 1 of the first output when the response of the associated cell is positive and which passes bit 1 of the first input to bit 1 of the first output when the response of the associated cell is negative; and d) a second switch which passes bit 1 of the first input to bit 0 of the first output when the response of the associated cell is positive and which passes the output of the second inverter to bit 0 of the first output when the response of the associated cell is negative.

18. Any of the logic circuits of claims 15, 16, or 17, wherein at least one of the switches comprises:

a means for receiving a control signal;

an inverter for negating the control signal;

a means for receiving a first input;

a means for receiving a second input;

a means for sending an output;

a first pass transistor, comprising a gate connected to the means for receiving the control signal, a source connected to the means for receiving the first input, and a drain connected to the means for sending the output, whereby the first input is passed to the output when the control signal is applied; and a second pass transistor, comprising a gate connected to an output of the inverter, a source connected to the means for receiving the second input, and a drain connected to the means for sending the output, whereby the second input is passed to the output when the control signal is not applied.

19. A method for simultaneously prioritizing and counting responses from a plurality of cells of an array comprising:

selecting states for tokens, wherein said states include an initial state, a first toggle state and a second toggle state, said states selected to either prioritize or count responses from the plurality of cells;

forming a chain of stages wherein each stage is associated with one cell of the plurality of cells, a first input to each stage comprises a token received from a previous stage, a second input to each stage comprises the response from the associated cell, a first output comprises a token to be sent to a next stage, and a second output comprises the token received from the previous stage;

using a token in the initial state as an input to a first stage in the chain of stages; and generating tokens which propagate from the first stage to a last stage in the chain of stages wherein the state of the output token of a stage is the same as the state of the input token to the stage if the response from the associated cell is negative, the output token may be in either the first toggle state or the second toggle state if the response from the associated cell is positive and the input token is in the initial state, the output token is in the second toggle state if the response from the associated cell is positive and the input token is in the first toggle state, and the output token is in the first toggle state if the response from the associated cell is positive and the input token is in the second toggle state;

whereby the responses of the cells may be prioritized and counted based on the first output of the last stage in the chain of stages and the second outputs of all the stages in the chain of stages.

* * * * *